UNITED STATES PATENT OFFICE 3,436,382
Patented Apr. 1, 1969

3,436,382
COMPOUNDS CONTAINING NITROGEN
AND FLUORINE
Samuel F. Reed, Jr., Huntsville, Ala., assignor to Rohm
& Haas Company, Philadelphia, Pa., a corporation of
Delaware
No Drawing. Filed Oct. 24, 1961, Ser. No. 147,714
Int. Cl. C08f *3/64, 3/68;* C07c *109/00*
U.S. Cl. 260—86.1                12 Claims This invention concerns polymerizable monomers, polymers and copolymers thereof. More particularly, it concerns esters of acrylic and alkacrylic acids with carbinols containing difluoramino groups and the polymers and copolymers thereof.

Nitrogen- and fluorine-containing monomers which would yield polymers with good physical properties would be most desirable. Particularly desirable would be polymerizable nitrogen- and fluorine-containing compounds which could be copolymerized with other monoethylenically unsaturated monomers, thus producing copolymers with a wide range of properties. These requirements are fulfilled by the compounds of the present invention.

It has been found that polymerizable compounds with very desirable physical and chemical properties result when anhydrides of acrylic and alkacrylic acids are reacted with carbinols containing difluoramino groups.

The compounds of the present invention can be represented by the following formula $$CH_2=C-\overset{O}{\underset{R}{C}}-OR^1$$

in which R is selected from the group consisting of hydrogen, methyl and ethyl, and $R^1$ is selected from the group consisting of

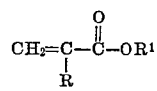

in which $n$ is an integer from 1 to 5, and $R^4$ is selected from the group consisting of hydrogen and methyl,

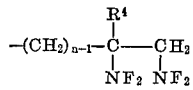

and

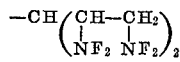

in which $R^2$ is selected from the group consisting of hydrogen and lower alkyl containing 1 to 4 carbon atoms, and $R^3$ is selected from the group consisting of hydrogen and lower alkyl containing 1 to 4 carbon atoms.

The monomers of the present invention provide means for introducing difluoramino groups into polymers. By copolymerizing with other ethylenically unsaturated polymerizable monomers, the nitrogen and fluorine contents of the copolymers can be readily controlled. The polymers and copolymers of the present invention are useful as oil-resistant coatings.

The anhydrides of acrylic and alkacrylic acids can be prepared by the well-known reaction which consists of reacting the sodium salt of the acid with the acid chloride in the presence of a solvent in which the reactants and products are soluble but in which NaCl is insoluble. As the reaction proceeds, the NaCl precipitates and the anhydride is recovered from the solution, generally by distillation.

Another method of preparation is by making a mixed anhydride of the acrylic acid and trifluoracetic acid by reacting the acrylic acid with trifluoroacetic anhydride. The carbinol is added portion-wise to this mixture. Although a mixture of esters results, separation is not difficult, and the carbinol can be readily recovered from the trifluoroacetate ester.

It is preferred to add a polymerization inhibitor to the reaction mixture during the preparation of the monomer. Such polymerization inhibitors are well-known, and typical are hydroquinone, quinone, tert-butyl-catechol, etc. 0.05% to 0.2% on the weight of the reaction mixture is employed. Diphenyl picrylhydrazyl was found to be particularly effective as a polymerization inhibitor.

The carbinols of the formula

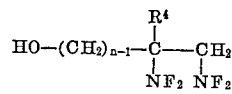

in which $n$ is an integer from 1 to 5, are prepared by reacting alkenyl esters with $N_2F_4$. Thus, allyl trifluoroacetate is reacted with tetrafluorohydrazine, $N_2F_4$, to give the adduct which is then transesterified with methanol to give 2,3-bis(difluoramino)propanol-1. In a similar manner, vinyl trifluoroacetate by the same series of reactions, gives 1,2-bis(difluoramino)ethanol.

Typical of the carbinols of this type are:

1,2-bis(difluoramino)ethanol,
2,3-bis(difluoramino)-2-methyl-propanol-1,
2,3-bis(difluoramino)butanol-1,
1,2-bis(difluoramino)pentanol-3, and
5,6-bis(difluoramino)hexanol-3.

The carbinol of the formula

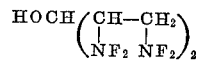

is prepared by the addition of $N_2F_4$ to double bonds followed by further reaction. Thus, divinyl carbinol is esterified by reacting with trifluoroacetic anhydride, the resulting ester is reacted with two moles $N_2F_4$ and the adduct is transesterified with methanol to produce bis(1,2-difluoraminoethyl)carbinol, which can also be named 1,2, 4,5-tetrakis(difluoramino)pentanol-3.

The carbinols of the formula

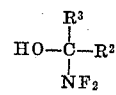

are prepared by reacting compounds of the formula

with difluoramine, $HNF_2$. $R^2$ and $R^3$ are as hereinbefore described.

Typical of these alcohols are: α-difluoraminomethanol, α-difluoraminoethanol, and α-difluoraminobutanol.

The ratios of anhydride to carbinol can be varied widely and still be within the scope of the present invention. However, in the preferred embodiment, a slight excess over the theoretical amount of anhydride is used to insure as complete utilization of the carbinol as possible. Thus, 1.1 to 1.2 moles of anhydride are used for 1 mole of carbinol.

The order of addition is not important and the carbinol may be added to the anhydride or vice versa. Since the reaction is exothermic and since it is desired to maintain the reaction mixture at a relatively low temperature to prevent polymerization of the product, it is preferred to employ step-wise addition of the one reactant to the other. External cooling may also be employed during addition to control the temperature of the reaction mixture. The reaction temperature employed will depend on the particular reactants, but will be in the range of 10° C. to 50° C., 10° to 30° C. being preferred.

Solvents may also be used to control the exotherm, although in the preferred embodiment they are not. Any solvent which is inert, i.e. does not react with reactant or the product under the reaction conditions can be used and suitable solvents include diethyl ether, methylene chloride, benzene, toluene, etc.

It is preferred that the reaction be conducted under anhydrous conditions, preferably in an inert atmosphere, such as nitrogen, argon or helium.

The acrylates and alkacrylates of this invention may be polymerized at ordinary temperatures and pressures even without the aid of a polymerization catalyst. The polymerization is most suitably conducted, however, in the presence of a free-radical producing catalyst at temperatures of 25° C. to 125° C. The polymerization initiator can be, for example, an organic or inorganic peroxide such as diethyl peroxide, di-tert-butyl peroxide, benzoyl peroxide, lauroyl peroxide, hydrogen peroxide, and the like; or it can be a salt of a peracid such as ammonium sulfate, sodium perborate, potassium percarbonate, and the like; or it can be one of the very active organic azo catalysts described in Hunt, U.S. Patent 2,471,959, such as alpha, alpha'-azobis(alpha, gamma-dimethyl-valeronitrile).

The properties of the compounds of the present invention can be altered by copolymerizing with comonomers. Suitable comonomers include methyl acrylate, ethyl acrylate, butyl acrylate, 2-ethylhexyl acrylate, and the higher alkyl esters of methacrylic and ethacrylic acids. Esters of this type include the butyl, 2-ethylhexyl, decyl and lauryl esters of methacrylic and ethacrylic acids.

Other suitable comonomers include vinyl ethers, vinyl esters, such as vinyl acetate, vinyl stearate; styrene, vinyltoluene, vinyl naphthalene, acrylonitrile, methacrylonitrile and mixtures thereof.

The polymeric acrylates and alkacrylates of the present invention are tough elastic polymers and, as such, are suitable as binders in compositions such as caulking compounds and the like. When employed in solvent for the application of coatings which exhibit a high degree of oil and water resistance, it is frequently desirable to copolymerize with another monomer which will impart hardness, mar- and abrasion-resistance to the resulting film. Typical of such monomers are methyl methacrylate, styrene, vinyltoluene, acrylonitrile and methacrylonitrile. For compositions such as pressure sensitive adhesives, polymers even softer than the polymers of the present invention are required, and these polymers can be obtained by copolymerizing the monomers of the present invention with monomers which of themselves give soft polymers. Typical of such monomers are the butyl, 2-ethylhexyl, decyl and lauryl esters of acrylic, methacrylic and ethacrylic acids.

The amounts of comonomers used will vary depending on the particular application, but both the hardening and plasticizing comonomers may be used in amounts varying from 5 to 50% of the total copolymer weight.

If a substantially cross-linked copolymer is desired, a polyethylenically unsaturated polymerizable monomer can be added to monomer mixture prior to polymerization. Such polyethylenically unsaturated polymerizable monomers suitable as cross-linkers are well-known in the art and typical of such compounds are the polyvinyl aromatic hydrocarbons including divinylbenzene, trivinylbenzene, divinylnaphthalene; glycol diacrylates and dimethacrylates including ethylene glycol dimethacrylate; and ethers of polyhydric alcohols, such as divinoxyethane and trivinoxypropane. Depending on the intended use for the polymer, the amount of cross-linker will vary. The amount used in generally in the range of 1% to as high as 30% of the weight of the monomer mixture.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted.

Example I

To a three-necked flask fitted with magnetic stirrer, condenser, thermometer and dropping funnel (all outlets covered with Drierite drying tubes) and containing 21.0 grams (0.13 mole) 2,3-bis(difluoramino)-propanol-1 was added very slowly 18.5 grams (0.12 mole) methacrylic anhydride over a period of three hours. An ice-water bath was employed to maintain the temperature at or below 27° C. The reaction was allowed to continue for an overnight period. The reaction mixture was then dissolved in ether and washed free of acid with 10% sodium bicarbonate solution, then with water and dried over anhydrous magnesium sulfate. Evaporation of the ether left a liquid residue the infrared spectrum of which indicated the desired methacrylate. Distillation of the mixture gave the 2,3 - bis - (difluoramino)propyl methacrylate, B.P. 54° C. (1 mm.).

A second method employs the following sequence of reactions:

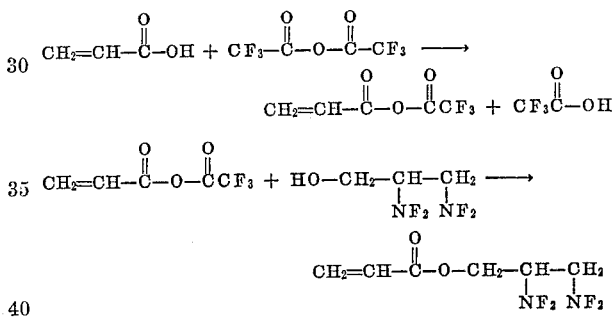

The preferred procedure for this sequence of reactions is as follows:

To a three-necked flask fitted with magnetic stirrer, thermometer, reflux condenser and dropping funnel (all outlets covered with Drierite drying tubes) containing 20.0 grams (0.36 mole) acrylic acid was added 20.0 grams (0.095 mole) trifluoroacetic anhydride at such a rate that the temperature did not rise above 41° C. This reaction was continued for a period of five hours at ambient temperature, then the mixture was cooled to 0–5° C. and 7.0 grams (0.043 mole) 2,3-bis(difluoramino) propanol-1 was added over a period of thirty minutes maintaining the temperature under 10° C. After standing overnight the mixture was dissolved in ether, washed thoroughly with 10% sodium bicarbonate, then with water and finally dried over anhydrous sodium sulfate. Removal of the ether left a liquid residue whose infrared spectrum indicated a mixture of esters, 2,3-bis-(difluoramino)propyl acrylate and 2,3 - bis(difluoramino)propyl trifluoroacetate with the former being present in the greater amount. Attempts to separate the esters by distillation through an 18 inch Holtzman column was not completely successful and attempted distillation through a 36 inch spinning band column resulted in polymerization of the acrylate ester.

The former method is preferred and has generally been used for the preparation of the subject compounds.

Example II.—2,3-bis(difluoramino)propanol-1 and acrylic anhydride

To 8.10 grams (0.05 mole) 2,3-bis(difluoramino) propanol-1 contained in a 50 ml. three-necked flask fitted with magnetic stirrer, reflux condenser, thermometer and dropping funnel (all outlets covered with Drierite drying tubes) was added slowly 5.67 grams (0.045 mole) acrylic anhydride at such a rate that the exotherm noted on the addition of each increment was less than 5° C. The reaction was continued at ambient temperature for an overnight period (approximately 20 hours). The reaction mixture was then taken up in ether and washed free of acid with cold saturated sodium bicarbonate solution, then washed thoroughly with water and dried over anhydrous magnesium sulfate. Finally the ether was removed by evaporation leaving 9.73 grams of liquid residue. This residue was distilled in the presence of 1% hydroquinone to give 5.1 grams (51.5%) of 2,3 - bis (difluoramino)propyl acrylate, B.P. 64–66 (5 mm.).

Analysis.—Calculated for $C_6H_8F_4N_2O_2$ (percent): C, 33.33; H, 3.71; F, 35.18; N, 12.96. Found: C, 32.76; H, 3.90; F, 35.70; N, 14.89.

Example III.—1,2-bis(difluoramino)pent-4-enol-3 and methacrylic anhydride

Under conditions similar to that described above 7.31 grams (0.0388 mole) 1,2 - bis(difluoramino)pent-4-enol-3 was reacted with 6.16 grams (0.04 mole) methacrylic anhydride to give 8.66 grams (87%) of 1,2-bis(difluoramino)pent - 4 - en - 3 - yl acrylate, B.P. 70–75° C. (0.5 mm.).

Analysis.—Calculated for $C_6H_{12}F_4N_2O_2$ (percent): C, 42.19; H, 4.68; F, 29.67; N, 10.93. Found: C, 41.41; H, 4.86; F, 30.95; N, 11.51.

Example IV.—1,2-bis(difluoramino)pent-4-enol-3 and acrylic anhydride

In a similar manner was obtained 10.54 grams (87%) of 1,2 - bis(difluoramino)pent - 4 - en - 3 - yl acrylate, B.P. 68–72° C. (0.6 mm.), from the reaction of 12.06 grams (0.064 mole) 1,2 - bis(difluoramino) - pent-4-enol-3 with 6.30 grams (0.05 mole) acrylic anhydride.

Analysis.—Calculated for $C_8H_{10}F_4N_2O_2$ (percent): C, 39.68; H, 4.13; F, 31.40; N, 11.56. Found: C, 39.46; H, 4.79; F, 33.22; N, 13.95.

Example V.—2,3-bis(difluoramino)butanol-1 and methacrylic anhydride

From the reaction of 2.66 grams (0.0015 mole) 2,3-bis-(difluoramino)butanol-1 and 2.31 grams (0.015 mole) methacrylic anhydride was obtained 3.04 grams (83%) of 2,3 - bis(difluoramino)-butyl methacrylate, B.P. 52–53° C. (7 mm.).

Analysis.—Calculated for $C_8H_{12}F_4N_2O_2$ (percent): C, 39.32; H, 4.92; F, 31.16; N, 11.47. Found: C, 40.16; H, 4.82; F, 31.92; N, 12.61.

Example VI.—1,2-bis(difluoramino)ethanol and methacrylic anhydride

From a reaction of 2.68 grams (0.0018 mole) 1,2-bis-(difluoramino)ethanol and 2.77 grams (0.018 mole) methacrylic anhydride was obtained 3.74 grams of a polymeric material showed by infrared spectral data to be the poly-1,2-bis(difluoramino)ethyl methacrylate.

These compounds are capable of undergoing the usual polymerization and copolymerization reactions.

Particularly if the reactions are conducted at elevated temperatures, and/or if the reaction time is prolonged, then it is preferred to use a polymerization inhibitor to prevent loss of product, and to prevent the formation of undesirable gums in the reaction equipment. As set forth in the second full paragraph of page 4 of this specification, such polymerization inhibitors are well-known, and typical are hydroquinone, quinone, tert-butyl-catechol, etc. Diphenyl picrylhydrazyl was found to be particularly effective as a polymerization inhibitor. 0.05% to 0.2% on the weight of the reaction mixture is employed. The examples given hereinbefore can be conducted in this manner.

I claim:
1. Compounds of the formula

$$CH_2=C-\underset{R}{C}-OR^1 \quad (O)$$

in which R is selected from the group consisting of hydrogen, methyl and ethyl, and $R^1$ is selected from the group consisting of $$-(CH_2)_{n-1}-\underset{NF_2}{\overset{R^4}{C}}-\underset{NF_2}{CH_2}$$

in which $n$ is an integer from 1 to 5 and $R^4$ is selected from the group consisting of H and $CH_3$, $$-CH\left(\underset{NF_2}{\overset{C---CH_2}{\underset{NF_2}{|}}}\right)_2$$

and $$-\underset{NF_2}{\overset{R^3}{C}}-R^2$$

in which $R^2$ is selected from the group consisting of hydrogen and lower alkyl containing 1 to 4 carbon atoms, and $R^3$ is selected from the group consisting of hydrogen and lower alkyl containing 1 to 4 carbon atoms.

2. Polymers of the compounds of claim 1.

3. The process for the preparation of the esters as set forth in claim 1 which comprises reacting at 10° C. to 50° C. an acid anhydride selected from the group consisting of acrylic, methacrylic and ethacrylic anhydrides with a carbinol selected from the group consisting of carbinols of the formula $$HOCH\left(\underset{NF_2}{\overset{CH---CH_2}{\underset{NF_2}{|}}}\right)_2$$

$$HO-(CH_2)_{n-1}-\underset{NF_2}{\overset{R^4}{C}}-\underset{NF_2}{CH_2}$$

in which $n$ is an integer from 1 to 5 and $R^4$ is selected from the group consisting of H and $CH_3$, and $$HO-\underset{NF_2}{\overset{R^3}{C}}-R^2$$

in which $R^2$ is selected from the group consisting of hydrogen and lower alkyl containing 1 to 4 carbon atoms, and $R^3$ is selected from the group consisting of hydrogen and lower alkyl containing 1 to 4 carbon atoms.

4. A process as set forth in claim 3 in which the reaction is carried out in the presence of a polymerization inhibitor selected from the group consisting of hydroquinone, quinone, tert-butyl-catechol, and diphenyl picrylhydrazyl.

5. The process for the preparation of the esters of claim 1 which comprises reacting at a temperature of 10° to 50° C. acrylic acid with trifluoroacetic anhydride and reacting the product of this reaction with carbinols as set forth in claim 7.

6. A process as set forth in claim 5 in which the reaction is carried out in the presence of a polymerization inhibitor.

7. A process as set forth in claim 5 in which the reaction is carried out in the presence of a polymerization inhibitor selected from the group consisting of hydroquinone, quinone, tert-butyl-catechol, and diphenyl picrylhydrazyl.

8. A process as set forth in claim 7 in which the polymerization inhibitor is present in the amount of 0.05% to 0.2% of the weight of the reaction mixture.

9. Copolymers of the monomers of claim 1 with monoethylenically unsaturated compounds.

10. Copolymers of the monomers of claim 1 with polyethylenically unsaturated compounds.

11. Copolymers of the monomers of claim 1 with monoethylenically unsaturated compounds selected from the group consisting of alkyl acrylates, alkyl methacrylates, vinyl ethers, vinyl esters, styrene, vinyl toluene, vinyl naphthalene, acrylonitrile, methacrylonitrile and mixtures thereof.

12. Copolymers as set forth in claim 10 in which the polyethylenically unsaturated compounds are selected from the group consisting of divinylbenzene, trivinylbenzene, divinylnaphthalene, glycol diacrylates and glycol dimethacrylates, and ethers of polyhydric alcohols.

References Cited

Hoffman et al., Chem. Reviews, vol. 62, pp. 12 to 18 (1962).

LELAND A. SEBASTIAN, *Primary Examiner.*

U.S. Cl. X.R.

260—80.3, 82.1, 85.5, 86.1, 88.1, 89.5, 486, 584